United States Patent

Bowker et al.

[11] Patent Number: 6,128,369
[45] Date of Patent: Oct. 3, 2000

[54] EMPLOYING CUSTOMER PREMISES EQUIPMENT IN COMMUNICATIONS NETWORK MAINTENANCE

[75] Inventors: Duane Oliver Bowker, Tinton Falls; William Richard Daumer, East Windsor; Kevin Alan Shelby, Scotch Plains; Howard M. Singer, Marlboro, all of N.J.

[73] Assignee: A.T.&T. Corp., New York, N.Y.

[21] Appl. No.: 08/856,266

[22] Filed: May 14, 1997

[51] Int. Cl.[7] .............................. H04M 1/24; H04M 1/00
[52] U.S. Cl. ................... 379/29; 379/6; 379/347; 379/398; 455/69
[58] Field of Search ................... 379/398, 403, 379/229, 410, 347, 1, 6, 24, 29; 455/67.6, 69, 522

[56] References Cited

U.S. PATENT DOCUMENTS

| | | | |
|---|---|---|---|
| 4,320,257 | 3/1982 | Warman | 379/202 |
| 4,891,840 | 1/1990 | Reudink | 704/203 |
| 4,937,856 | 6/1990 | Natarajan | 379/158 |
| 5,195,132 | 3/1993 | Bowker et al. | 379/410 |
| 5,206,902 | 4/1993 | Bowker | 379/220 |
| 5,278,992 | 1/1994 | Su et al. | 455/69 |
| 5,333,195 | 7/1994 | Bowker et al. | 379/410 |
| 5,471,527 | 11/1995 | Ho et al. | 379/347 |
| 5,473,666 | 12/1995 | Szczebak, Jr. et al. | 379/3 |
| 5,473,667 | 12/1995 | Neustein | 455/31.2 |
| 5,521,919 | 5/1996 | Anderson et al. | 370/68 |
| 5,539,806 | 7/1996 | Allen et al. | 379/52 |
| 5,612,996 | 3/1997 | Li | 379/390 |
| 5,737,389 | 4/1998 | Allen | 379/1 |
| 5,802,164 | 9/1998 | Clancy et al. | 379/347 |
| 5,887,245 | 3/1999 | Lindroth et al. | 455/69 |
| 5,892,823 | 4/1999 | Stelman | 379/387 |

OTHER PUBLICATIONS

Gay, S. et al., "Algorithms For Multi–Channel DTMF Detection For The WE® DSP32 Family," Proc. IEEE Inter. Conf. on Acoustics, Speech and Sig. Pro., pp. 1134–1137, 1989.

*Primary Examiner*—Reinhard J. Eisenzopf
*Assistant Examiner*—Charles N. Appiah

[57] ABSTRACT

The present invention customizes a network connection to customer premises equipment using a calibration signal. A network signal processor emits a tag signal indicating that a signal processing platform is in use. Customer premises equipment (CPE) issues a calibration signal to the network signal processor based on detection of the tag signal. The customer premises equipment outputs the calibration signal to the network signal processor which measures the signal loss, adjusts the gain mapping and issues a calibration signal to the customer premises equipment. The customer premises equipment then estimates spectral shaping based on the calibration signal from the network signal processor and equalizes the receive path so that the signal processing platform is detected and implemented. Embodiments of the present invention are illustrative of a more general concept of the use of CPE as an agent in telephone network maintenance.

3 Claims, 3 Drawing Sheets

EMPLOYING CUSTOMER PREMISES EQUIPMENT IN COMMUNICATIONS NETWORK MAINTENANCE

FIELD OF THE INVENTION

The present invention is directed to a method and system for employing customer premises equipment (CPE) as an agent in communication network maintenance; and, in a particular embodiment, for employing CPE to aid in measuring the effect of network loss on received sound quality so that such loss may be compensated and sound quality thereby improved.

BACKGROUND OF THE INVENTION

TrueVoice® is a telephone network sound enhancement technology invented by AT&T Corp. TrueVoice provides AT&T customers with "closer," clearer sounding voice communications on telephone calls carried by the AT&T network. TrueVoice applies both a frequency independent gain (a constant gain across all frequencies in the telephone bandwidth) and a frequency selective gain (sometimes referred to as "pre-emphasis") to telephone connections. Technical features of TrueVoice are described in U.S. Pat. Nos. 5,195,132; 5,333,195; and 5,206,902(which are hereby incorporated by reference).

FIG. 1 is a diagram of a typical telephone network connection employing TrueVoice. It includes CPE 20 and 21 at two end points for a calling party and a called party, respectively, and analog and digital network components in between. CPE 20, 21 is, e.g., a conventional telephone. CPE 20, 21 is connected to a conventional hybrid converter 22, 23 at telephone central offices via local loops 31, 34. Each hybrid 22, 23 converts bi-directional signal transmission in a two-wire telephone line to two unidirectional signal paths (two wires each). The calling party's "transmit path" includes local loop 31, network paths 35 and 36 and local loop 34. This transmit path is also the called party's "receive path." The called party's transmit path includes local loop 34, network paths 38 and 37, and local loop 31. This transmit path is also the calling party's receive path. (Local loops 31 and 34 are common to both calling and called parties' transmit and receive paths.) The point of the network between paths 35 and 36/37 and 38 is said to be at 0 "TLP" (or transmission level point). This point may be conveniently used as a reference for gain or loss experienced at different points in the network.

Signals on the calling party transmit network path 35 are processed by a D/A-A/D converter 24, which is conventional equipment located at the calling part's local central office. (For clarity of presentation of the invention, conventional switches associated with the local central offices are not shown.) A long-distance telephone network switch, e.g., a No. 4 Electronic Switching System 26 (4ESS) in the AT&T Network, is connected to the D/A-A/D 24 converter of the local central office. The 4ESS 26 is then connected to a special automatic volume control filter (AVC) 30 which, as shown in FIG. 1, includes, for example, TrueVoice® elements 32 and 33. As a matter of general background, automatic volume control filters are conventional, for example, those described in U.S. Pat. Nos. 4,499,578 and 4,535,445, which are hereby incorporated by reference. TrueVoice element 33 applies the sound enhancement for speech signals spoken at CPE 20 for transmission to CPE 21. Element 32 applies echo cancellation to diminish an echo of speech signals (originally spoken at CPE 21) returning to CPE 21. As shown in FIG. 1, similar connections are used in network path 36 to deliver speech from the calling party. This path includes a −6 dB attenuator 29, intentionally inserted into the network, typically by the called party's Local Exchange Carrier (LEC), to further mitigate echo in a long distance connection (it is not needed in a local connection). The Figure further illustrates similar connections for network path 38 (which is like network path 35) and network path 37 (which is like network path 36). (Although much of the discussion which follows is presented from the point of view of the calling party's transmit path (which is the same as the called party's receive path), such discussion has applicability to the called party's transmit path/calling party's receive path, with for example, the roles of elements 32 and 33 reversed.)

The part of the network which is digital—that part between and including D/A-A/D converters 24, 25—exhibits no unintentional loss (there are −6 dB attenuators 28, 29, however, which are intentionally placed in the circuit). The analog part of the network—the balance of the network diagram of FIG. 1—does suffer unintentional loss, however. This loss is variable depending on the length of the local loop 31, 34 between the CPE 20, 21 and the central office. In addition, the level of a speech signal presented to the analog part of the network is variable, depending on the CPE (telephone) 20, 21 microphone efficiency, as well as how loudly a person is speaking into the microphone and how close the person's mouth is to the microphone. As shown in the Figure, the average loss on the analog portion of the calling party's transmit path—referred to as TOLR (telephone +local loop loss) is −46 dB.

As discussed in greater detail in the referenced patents, TrueVoice® 33 sound enhancement operates to mitigate the effect of signal loss in a telephone network connection for signals traveling from the calling party to the called party. TrueVoice 33 sits in the middle of the digital network and adds gain of a fixed amount (4 dB) to a computed input power of a transmitted speech signal. FIG. 2 illustrates this. The power of the transmitted (input) signal is computed over a time interval. For example, the signal may have an average power over the interval of −21 dB. TrueVoice will amplify the signal such that the signal will have an average power of 4 dB better (or −17 dB). If the average power of the input signal is −17 dB, the output power will be raised to −13 dB. Through its combination of pre-emphasis (base boost) and the AVC, TrueVoice 33 compensates some or all of the network path 31, 35 attenuation, as well as CPE 20 efficiency variation, to improve how speech carried over the telephone connection "sounds" to someone listening.

Although there is an optimal TrueVoice 33 output power level to which the network signal could be adjusted, TrueVoice employs a conservative boost of, e.g., a constant 4 dB, to compensate for attenuation suffered in the paths 31 and 35 of the network. Unfortunately, there are several variables related to the paths 34 and 36 of the network which affect the amount of signal loss a speech signal may suffer in transmission over a telephone circuit. For example, the attenuator 29 is not always present in a long distance connection. Network response variability is also caused by variation in local-loop 34 length carrying received signals and variability in the efficiency of CPE 21's electric-to-acoustic transduction. This response variability can cause, among other things, variability of objective loudness as perceived by telephone customers. Moreover, because TrueVoice® 33 applies a conservative gain mapping (4 dB, for example) when administering active volume control, called parties connected on long loops or loops that cause great attenuation may not be able to perceive all the benefits of TrueVoice® 33. Since TrueVoice 33 does not know what the loss will be on the paths 36, 34 of the network, it does not compensate for such loss and, in fact, provides a relatively conservative maximum gain because of this.

SUMMARY OF THE INVENTION

The present invention is directed to the use of CPE as an agent of the network to assist in providing network maintenance. An illustrative embodiment of the invention is directed to improving network sound enhancement systems, such as TrueVoice. In this embodiment, the TrueVoice network element 41 (see FIG. 3) emits a first signal at the beginning of an ordinary telephone call (where the reference numeral 41 has been used, rather than numeral 33, to indicate a TrueVoice element employing features related to an embodiment of the invention). This first signal is illustratively a sub-audible 25 Hz tone referred to as a "tag" signal (which the network otherwise uses with conventional TrueVoice to indicate to other network components that TrueVoice is being applied; see U.S. Pat. No. 5,206,902). When the CPE senses the first signal, it measures the loss in the signal (knowing a priori at what level the signal was transmitted) and responds with a signal of its own—a calibration signal. This calibration signal represents a measure of the first signal loss sensed by the CPE on the call. Illustratively, the calibration signal has the loss value encoded therein. The TrueVoice network 41 element decodes the measured loss information and adjusts the transmitted telephone signal (which is sent to the CPE 42) to account for the measured loss. In this embodiment, the system assumes that the loss measured at 25 Hz is applicable at other audible frequencies. Because signal loss is measured, network sound enhancement can be tailored on a call-by-call basis.

Embodiments of the present invention may also employ a wide-band signal (in addition to or instead of the tag signal) to allow measurement of loss at various frequencies in the audible range. The coded calibration signal then represents loss at these various frequencies. TrueVoice network element 41 adjusts the transmitted signal level differently at different frequencies so as to obtain a more frequency-dependent enhancement to network sound. The calibration signal may be of any suitable type and may include DTMF signals, coded sub-audible signals, spread spectrum signals, data signals from a voice-over-data modem signals, etc.

A further alternative embodiment is one in which the CPE does not measure the first signal, but merely provides a "loop back" of such signal to the network. The loop back signal level is then measured by the TrueVoice network element and loss is then estimated. In this embodiment, the loss measured by the network includes loss suffered in both a receive and transmit path (during both the transmission of the first signal, as well as the loop back transmission from the CPE). Therefore, loss in just the receive path must be estimated as, for example half of the total loss measured by the network element.

In these embodiments, the CPE is participating in the maintenance of the telephone network—in this case, the maintenance of network sound quality. This maintenance behavior shifts the paradigm of the "intelligent network but 'dumb' terminal" (CPE) to one which employs "smart" CPE providing assistance to the network in performing network maintenance.

DETAILED DESCRIPTION

Figure 1:
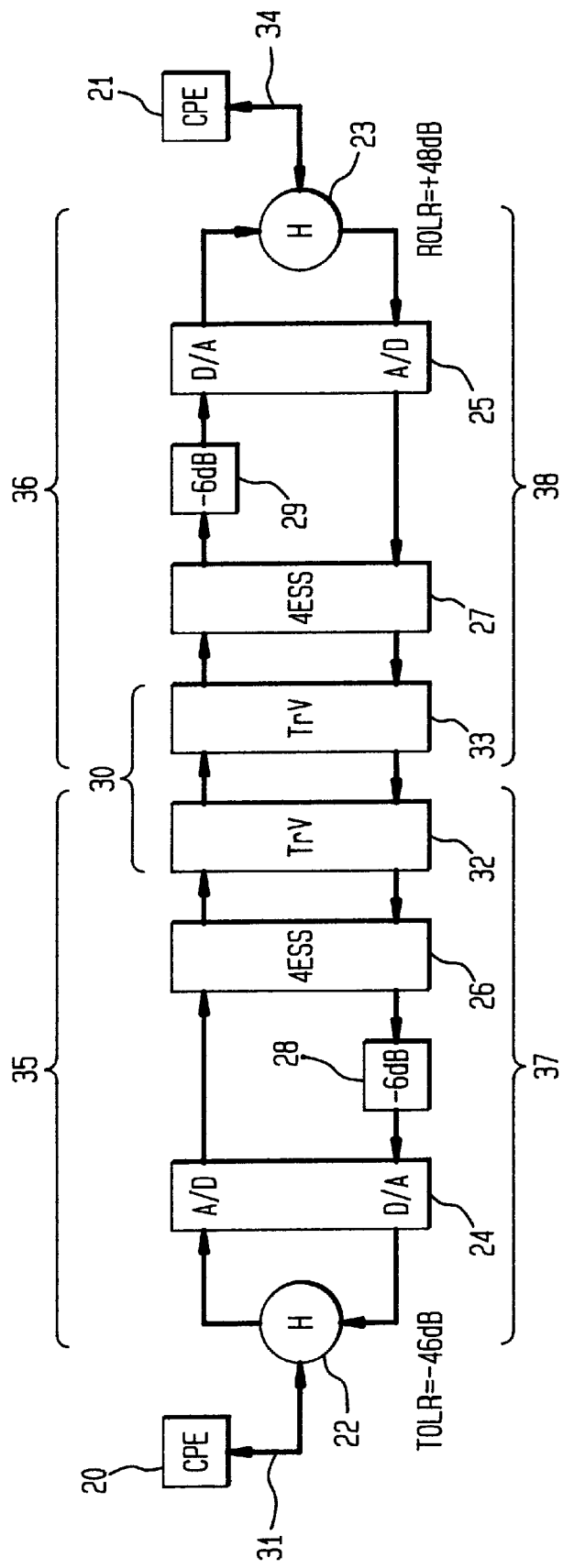
FIG. 1 is a diagram of a basic network connection.
Figure 2:
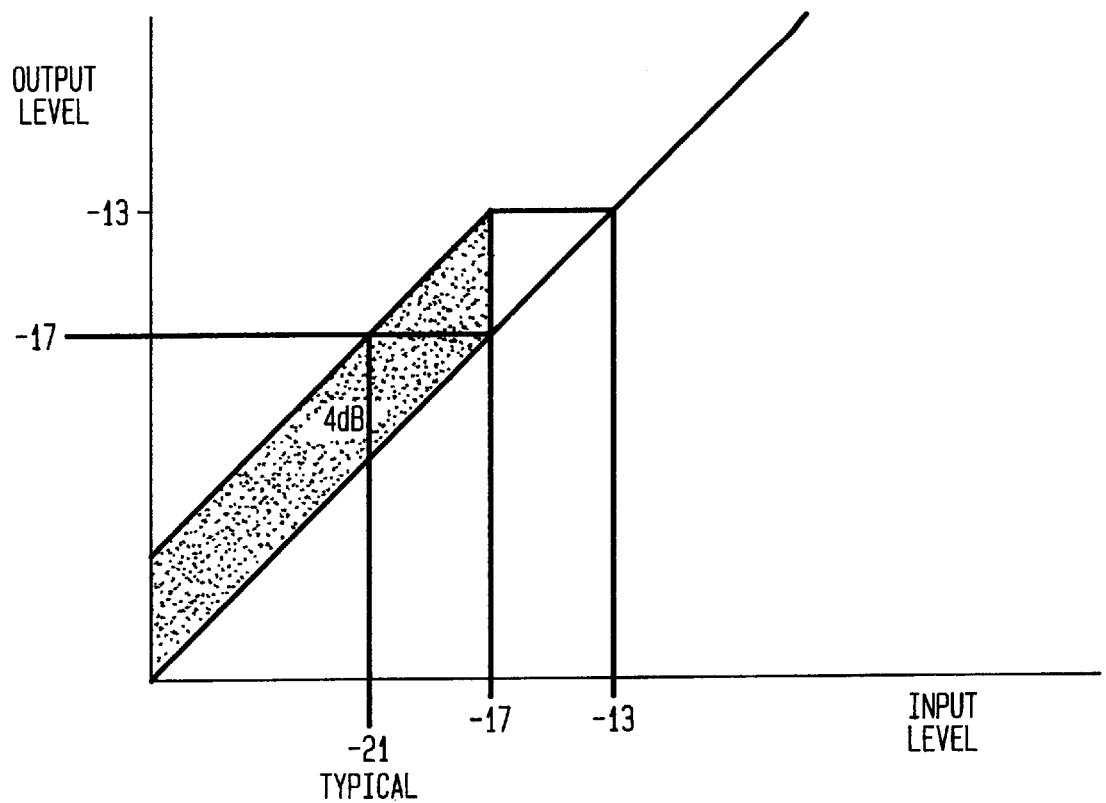
FIG. 2 is a graph of a prior art gain map for active volume control in the basic network connection shown in FIG. 1.
Figure 3:
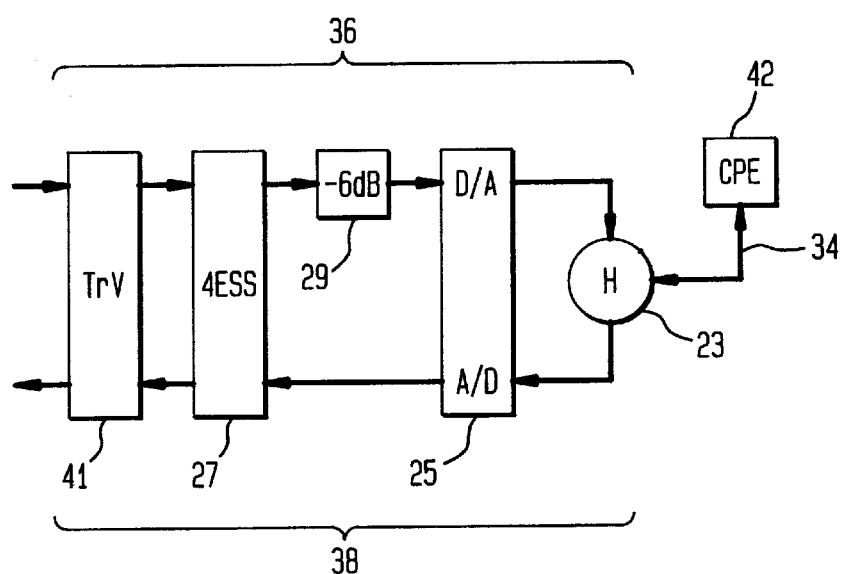
FIG. 3 is a diagram of an illustrative network connection according to the present invention.

The present invention will now be described in accordance with an illustrative embodiment presented in FIG. 3. FIG. 3 depicts a called party's half of a telephone network connection. The system depicted includes an enhanced TrueVoice system 41 4ESS 27, network attenuation element 29, a D/A-A/D converter 25, a hybrid converter 23, and CPE 42. System 41 comprises conventional digital signal processing hardware and software for performing the functions described below. As discussed above with reference to FIG. 1, FIG. 3 includes portions of called party receive and transmit paths 36, 38, respectively.

Gain Mapping

Figure 4:
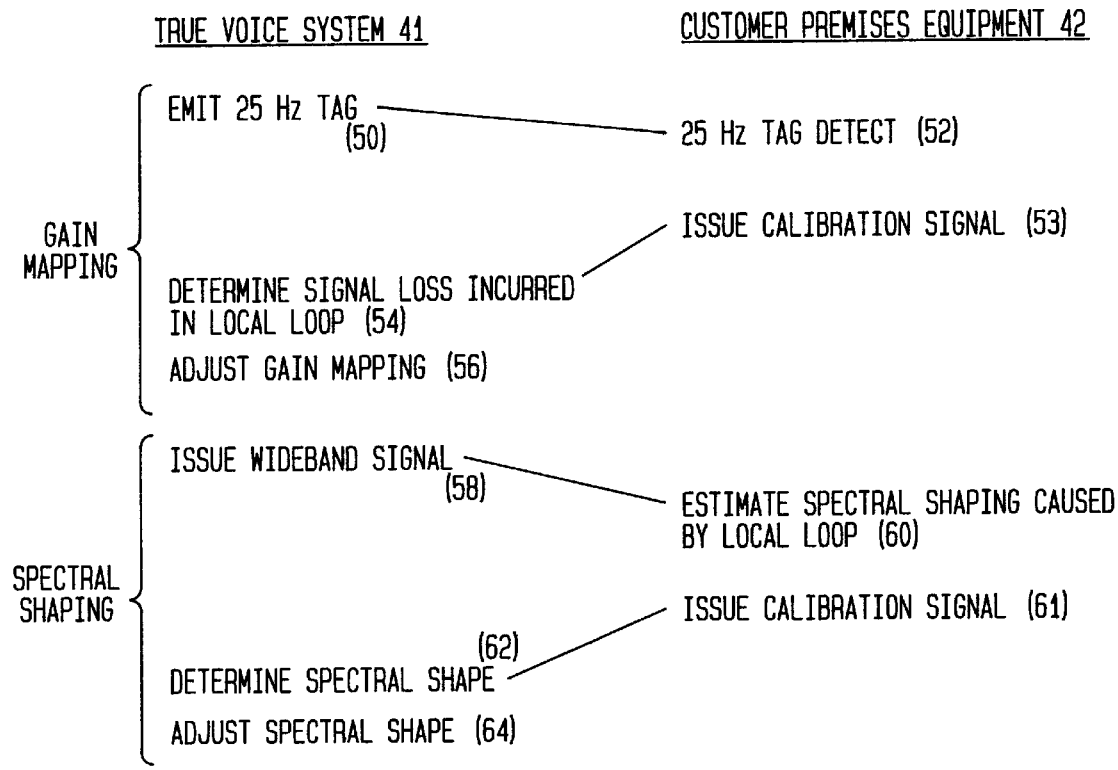
FIG. 4 is a diagram of the operation of the network connection in FIG. 3.

The illustrative embodiment of FIG. 3 functions to adjust the overall level of the signal transmitted to the called party. Steps carried out by the salient elements of FIG. 3 are illustrated in FIG. 4. The TrueVoice network signal processor 41 emits a tag signal, for example, a 25 Hz tone (which is also provided by conventional TrueVoice® 33), on the called party's receive path 36 to the CPE 42. Step 50. CPE 42, using conventional signal processing techniques, detects the presence and level of the tag signal. Step 52. The paper "Algorithms for Multi-Channel DTMF Detection for the WEDSP32 Family," Gay et. al., *Proc. IEEE International Conf. on Acoustics, Speech and Sig. Pro.*, pp.1134–1137, 1989, sets forth illustrative signal processing techniques for detecting tones in the subscriber loop (and is hereby incorporated by reference as if set forth fully herein). The CPE 42 may provide a visual indication notifying a customer that TrueVoice 41 is present through use of a lamp, LED, LCD display or other icon. The network enhancement (TrueVoice®) can also be audibly branded by, for example, using a unique tone or announcement.

In response to detecting the 25 Hz tag, CPE 42 issues a first calibration signal. Step 53. The first calibration signal can be, for example, a tone, white noise, a spread spectrum signal, etc. This calibration signal represents the amount of loss suffered by the tag in traversing the receive path 36, 34 to the CPE 42 from the TrueVoice processor 41. First, CPE 42 computes the received tag signal power using any of the conventional techniques. For example, a measure of signal power may be computed as the square of the received signal voltage. Then, the loss is determined as the difference between received tag signal power and transmitted tag signal power (known a prior). CPE 42 then encodes the measured loss using any of the available techniques. For example, loss can be represented as a number of tone bursts, a duration of a tone, or data transmitted as a spread spectrum signal.

Detection of the 25 Hz tag can be in the analog domain to avoid problems incurred in signal conversion. This would allow detection for a broader class of CPE that may not have digital signal processing capability. However, tag detection, loss computation, and calibration signal generation can be readily performed with conventional techniques by CPE 42 (e.g., telephones) having signal processing capabilities.

The TrueVoice system 41 receives the calibration signal transmitted by CPE 42 via path 38 and decodes the loss value represented by the signal using a conventional detection process suitable to the encoding of the calibration signal (such as counting tone bursts, measuring tone length, or receiving and decoding a spread spectrum signal). Step 54. As a result of having this measure of loss in the called party's receive path 36, 34, the TrueVoice system 41 adjusts the gain on the signal it transmits on that path 36 to compensate for the measured signal loss. Step 56.

While loss is what is most likely, it may be that the local loop 34 of the called party actually provides a gain. In such a case, the TrueVoice system 41 can scale back its gain to avoid overwhelming the called party. On a long or weak local loop 34, a more aggressive gain can be applied to compensate for loss. Because of this, the term "loss" can be generally construed in either its positive sense—signal level attenuation—or its negative sense—signal boost—experienced during transmission of the tag signal on the path 36, 34. Similarly, the term "gain" can be generally construed in either its positive sense—signal boost—or in its negative sense—signal attenuation. For purposes of embodiment illustration, however, the terms "loss" and "gain" are used in their positive senses. Naturally, the inventive concepts go to either senses of these terms.

Figure 5:
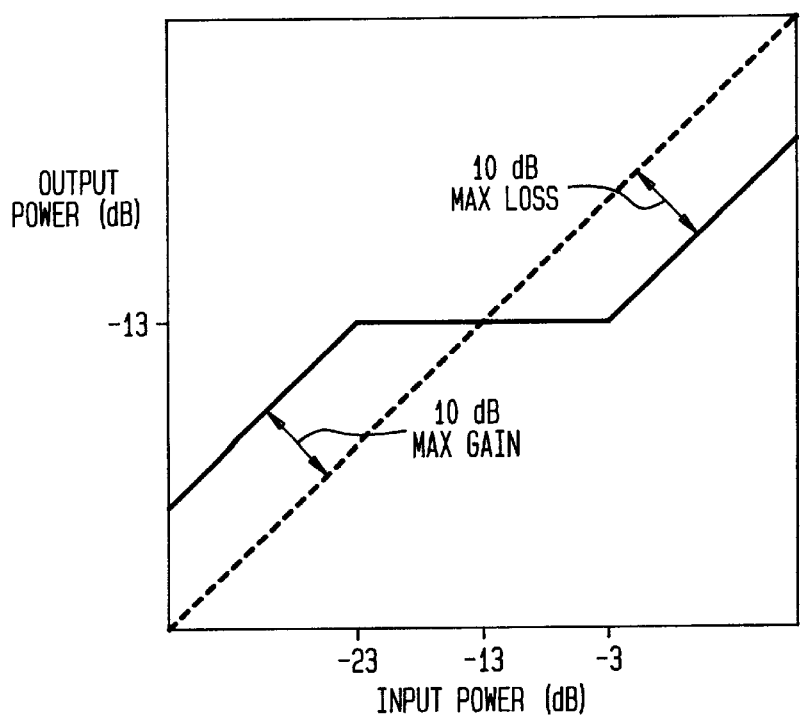
FIG. 5 is an illustrative gain map for a TrueVoice system that assumes a prototypical loss between TrueVoice system and the listener at CPE, in accordance with the present invention.

TrueVoice system 41 operates in accordance with a two stage process to apply appropriate gain in accordance with the invention. First, the input signal to element 41 on path 36 is processed in accordance with a gain map. The gain map provides a signal gain, over a range of input power, that appropriately compensates for variations in signal power introduced prior to that point in the connection (i.e., by elements 20, 31, and 35, see FIG. 1) and that assumes a prototypical loss characteristic for the remainder of the circuit (i.e., for elements 36, 34, and 42). This gain would be applied in accordance with the gain map regardless of whether system 41 received any calibration signal from CPE 42. An illustrative gain map is presented in FIG. 5. If the calibration signal is received by TrueVoice system 41, then further signal processing is performed on the input signal to adjust it in accordance with a level of gain (or loss) indicated by the calibration signal. That is, the output signal from the gain map stage (i.e., the input signal adjusted in accordance with the gain map) is multiplied by a gain (or loss) value provided in accordance with the calibration signal. Thus:

$$S_O = S_{gm} * g_c$$

where $S_O$ is the signal output from system 41, $S_{gm}$ is the signal from the gain map stage of system 41, and $g_c$ is the gain determined in accordance with the calibration signal. If no calibration signal is received (because of the absence of CPE capable of participating in the calibration process, for example), this second stage gain factor is unity (effectively providing no adjustment beyond the gain map stage). Thus, with an appropriate gain applied by system 41, callers on long loops receive sufficient gain to perceive the benefits of the TrueVoice® enhancement. Further, the risk of over driving callers on shorter loops is eliminated.

Spectral Shaping

Spectral shaping is the process by which the level of a signal is adjusted on a frequency-dependent basis so as to achieve a desired "sound" at the CPE 42. This is done by a process which determines the frequency response of the receive path 36, 34 and adjusts the level of the signal communicated over that path so as to achieve a desired effect, such as a flat (i.e., equalized) over-all frequency response. Spectral shaping is achieved in accordance with the illustrative embodiment of the present invention as shown in FIGS. 3 and 4 and may be performed instead of or in addition to the gain mapping discussed above.

To perform spectral shaping, the TrueVoice system 41 issues a wide-band signal to CPE 42. Step 58. This wideband signal includes frequency components across the band in which spectral shaping is desired. The wide-band signal illustratively comprises sinusoids (tones) of equal amplitude spaced at 50 Hz intervals across the standard telephone bandwidth. The CPE 42 detects the tones and determines the loss at the tone frequencies with the use of conventional tone detection techniques. Step 60. CPE 42 then encodes the tone loss values and transmits a calibration signal back to the TrueVoice system 33. Step 61. As discussed above, encoding of the measured loss of the tones by CPE 42 can be done using any of the available techniques. For example, loss at a tone frequency can be represented as a number of tone bursts, a duration of a tone, or data transmitted as a spread spectrum signal.

The TrueVoice system 41 receives the calibration signal transmitted by CPE 42 and decodes the tone loss values represented by the calibration signal using a conventional detection process suitable to that signal (such as counting tone bursts, measuring tone length, or receiving and decoding a spread spectrum signal). Step 62. The TrueVoice system 41 performs conventional interpolation of tone loss values it determines from the received calibration signal to approximate loss values at frequencies other than the tone frequencies. As a result of having this measure of loss in the called party's receive path 34, 36 at various frequencies, the TrueVoice system 41 adjusts the gain on the signal it transmits on path 36 to compensate for the measured signal loss. Step 64. In this case, the gain is variable with frequency, in accordance with the calibration signals received from the CPE 42. Gain may be applied as discussed above for each range of frequencies desired.

As an alternative to transmitting calibration signals back to the TrueVoice system 41, whether relating to a single tone or a wideband signal, the CPE 42 can apply conventional equalization to the signals received from path 36 to enhance the quality of sound reproduced at the CPE 42, rather than relying on the network element to do so.

Loop Back

In both the gain mapping and spectral shaping discussions above, loss caused by a signal's traversal of the receive path 34, 36 is measured by the CPE and communicated back to the TrueVoice system 41 where compensation for the measured loss is applied. However, a measure of gain mapping and/or spectral shaping can be achieved through a "loop back" process. The loop back process is one in which the CPE 42 does not measure and communicate information relating to signal loss to the TrueVoice system 41, but rather the CPE receives a tag or wide-band signal from the TrueVoice system 41 on path 36 and returns (or "loops back") the signal to the TrueVoice system 41 on path 34, 38. The returned signal has thus traversed a loop from and to the TrueVoice system 41 via the CPE 42 and any loss experienced by the signal is the result of the signal traversing the two paths 34, 36, and 34, 38 (negating the effects of the CPE 42). Thus, the TrueVoice system 41 itself can determine directly what type of gain mapping/spectral shaping to do, rather than involve the CPE 42 in any computation of loss.

This loss as measured in accordance with the loop back technique is caused by both paths 34, 36 and 34, 38. Consequently, the TrueVoice system must approximate that portion of loss due to the receive path 34, 36 only. Loss could be apportioned evenly between the two paths, or, proportionately if a −6 dB attenuation is present in path 36.

DISCUSSION

The present invention provides communication between the TrueVoice system 41 and the CPE 42. This allows for a prescribed signal to be sent by one device to the other such that the other device can estimate the effects of the subscriber loop, i.e., signal loss, spectral shaping, etc. The embodiments of the present invention employ CPE as an agent of the network to assist in providing network maintenance. In these illustrative cases, the CPE acts as an agent to assist in the maintenance of network frequency response and volume control. The principles of the present invention may be extended to other situations where CPE can provide network elements with information about network performance so that the network can adjust its operation to maintain, e.g., service quality.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

For example, while the first signal is described as being sub-audible (e.g., the tag signal), an audible tone may be used.

As used herein, the term "wide-band" refers to a signal having more than a single frequency component, as distinct from the term "tone," which refers to a signal having a single frequency component.

As stated above, the network enhancement (TrueVoice®) can may be audibly branded by, for example, use of a unique tone or announcement. Such a tone or announcement may be generated within the telephone network and played at the CPE or it may be generated by the CPE in response to receipt of a first signal.

What is claimed is:

1. A method for enhancing performance of a network signal processing platform, said method comprising:

a) generating and transmitting a tag signal, the tag signal for receipt by customer premises equipment;

b) determining signal loss in a path of a local loop based on a first calibration signal issued by the customer premises equipment to the network signal processing platform, the first calibration signal representing tag signal loss;

c) adjusting gain mapping in the network signal processor in accordance with the determined signal loss;

d) generating and transmitting a wide-band signal, the wide-band signal for receipt by customer premises equipment;

e) estimating, upon receipt of a second calibration signal from the customer premises equipment, spectral shaping caused by the local loop, the second calibration signal representing wide-band signal loss at a plurality of frequencies; and f) equalizing the path of the local loop.

2. The method of claim 1 further comprising the steps of:

transmitting a second tag signal to customer premises equipment (CPE) via the telephone network path;

receiving from the CPE a second calibration signal representing loss experienced by two or more frequency components in the second tag signal due to transmission via the path; and adjusting gain applied to two or more frequency components of the speech signal transmitted from the network element to the CPE based on the second calibration signal.

3. A method for performing maintenance in a telephone network, the method comprising:

transmitting a first signal from a telephone network element to customer premises equipment (CPE) via a telephone network path;

receiving at the network element a second signal from the CPE representing information determined by the CPE in response to receipt of the first signal;

analyzing the second signal to determine a network maintenance action to be performed; and performing the network maintenance action by adjusting a telephone signal to compensate for the absence of an expected attenuator circuit in the telephone network.

* * * * *